United States Patent [19]

Gero et al.

[11] Patent Number: 5,041,212
[45] Date of Patent: Aug. 20, 1991

[54] EFFICIENCY SCREEN PLATE FOR SCREENING PULP

[75] Inventors: William A. Gero; Frank J. Paskowski, Jr., both of Pittsfield, Mass.

[73] Assignee: Beloit Corporation, Beloit, Wis.

[21] Appl. No.: 462,686

[22] Filed: Jan. 2, 1990

[51] Int. Cl.⁵ .............................................. D21D 5/16
[52] U.S. Cl. .................................. 209/273; 209/305; 209/397; 210/413
[58] Field of Search .............. 209/273, 300, 305, 306, 209/380, 397; 210/413, 415, 498

[56] References Cited

U.S. PATENT DOCUMENTS

| | | | |
|---|---|---|---|
| 2,068,511 | 1/1937 | Raisch | 210/498 X |
| 2,311,813 | 2/1943 | Beck et al. | 209/397 |
| 2,827,169 | 3/1958 | Cusi | 209/397 |
| 4,855,038 | 8/1989 | LeBlanc | 209/273 |

FOREIGN PATENT DOCUMENTS

| | | | |
|---|---|---|---|
| 11572 | 11/1963 | Fed. Rep. of Germany | 209/273 |
| 519680 | 4/1940 | United Kingdom | 209/397 |
| 2195911 | 4/1988 | United Kingdom | 209/397 |

*Primary Examiner*—Donald T. Hajec
*Attorney, Agent, or Firm*—Dirk J. Veneman; Raymond W. Campbell

[57] ABSTRACT

An improved efficiency screen plate for screening pulp in a pressure screening apparatus is disclosed wherein various design parameters are established which increase screen performance, particularly in screening medium consistency pulp. The basket is formed of thin, sheet-like material formed without machining into an undulating pattern. Undulation frequencies, slot location, turbulence bar frequency, and turbulence bar height are established for increasing screen performance.

17 Claims, 7 Drawing Sheets

ROTOR SIDE AND DIRECTION OF FLOW →

EFFICIENCY SCREEN PLATE FOR SCREENING PULP

BACKGROUND OF THE INVENTION i. Technical Field

The present invention pertains to improvements in pulp screening apparatus and pertains particularly to an improved efficiency screen basket for use in pressure screens wherein the basket configuration provides a higher level of efficiency than existing designs.

ii. Prior Art

In the papermaking process, screens are used to separate acceptable papermaking fiber from unacceptable constituents of a slurry of pulp fiber, in preparing the pulp slurry to be made into paper. In typical wood pulp screens, a slurry of pulp flows through a perforate, cylindrical screen plate or basket which may be smooth, or which may have a contoured surface facing toward the stock flowing through the screen, to increase the effective screening area. It is known to utilize different hole, slot or hole and slot combinations for optimizing screening performance.

To aid in passing the acceptable pulp through the screen plate, and to reduce plugging, pulsations are generated in the slurry, such as by passing a hydrofoil-shaped member past the screen plate. It is also known to use blunt, turbulence generating members on a screen rotor, to agitate the stock near the screen surface and improve screening efficiency. Such rotors generally operate effectively to screen pulp at one percent to two percent consistency, but do not work effectively at higher consistencies. U.S. Pat. No. 4,855,038 discloses a pulp screen rotor which generates both turbulence and pulse and has been found to work effectively at three percent to four percent consistencies and higher. In many applications, the higher consistencies, referred to as medium consistency, are preferred for process reasons.

To provide sufficient strength to the screen plate, which generally is a basket-shaped member surrounding the rotor, to withstand the pressure experienced in the pressurized screen, and to increase the screening capacity by presenting increased screening area, it has been the accepted practice in all pressure pulp screens to provide a thickly-walled screen plate which is machined to present the desired surface. Such machining is a time-consuming and expensive process. As a result of the manufacturing restrictions in the machining process, which are imposed at least in part by limitations of the machine tools themselves, the total available open accepts flow area in the screen plate has been limited, and the final shape of the screen plate has been a compromise between the limitations of machining and the desired optimum screening shape.

Since the machined screen plates are a single, integral piece, wear or damage in a small area has required replacement of the entire screen plate; including the screening surfaces, mounting surfaces, and support members. When the wear or damage occurs prematurely, the expense of operating such a screen increases significantly.

In co-pending application U.S. Ser. No. 07/206,151, filed June 10, 1988, a modular screen basket is disclosed wherein relatively thin, sheet-like material is formed into the desired shape or contour. Stamping, pressing, and bending techniques are taught to form the screen plate, which does not require machining. The holes or slots are taught to be created during, before, or after formation of the undulations in the sheet-like material, with suggested forming techniques including laser beam cutting and punching. Utilizing a punch die as part of the forming process is suggested as a simplified, cost-effective manner for forming the openings. The modular basket has sufficient strength for pressure screening applications, including medium consistency screening.

In co-pending U.S. application 07/206,151, (U.S. Pat. No. 4,954,249) it is suggested that numerous different undulating configurations, slot and hole combinations and other features can be utilized. The basket forming technique disclosed in U.S. Ser. No. 07/206,151 allows greater control of formation, both of the undulating surface and of the slot or hole openings. It has now been discovered that if various parameters are followed with respect to the physical characteristics of the basket, the basket will operate more efficiency, resulting in optimum screen performance, even at higher consistencies.

SUMMARY OF THE INVENTION

It is, therefore, one of the primary objects of the present invention to provide an improved efficiency screen plate for screening pulp in a pressurized screening apparatus.

Another object of the present invention is to provide design parameter for physical features in a screen basket resulting in optimum screen performance.

Still another object of the present invention is to provide an optimized screen basket for improving screen performance when medium consistency slurries are processed.

These and other objects are achieved in the present invention by providing a screen basket made of thin, sheet-like material formed into an undulating pattern, and provided with slots or hole openings for the passage of pulp. Five or less undulations are provided per inch of basket circumference, and the slot openings are provided at top dead inside center of the undulation, plus or minus 90 degrees to the direction of flow. Turbulence bars are provided in at least every third undulation, which turbulence bars protrude above the undulations no more than about 0.187 inch.

Further objects and advantages will be apparent from the following detailed description and the accompanying drawings.

DETAILED DESCRIPTION OF THE PREFERRED EMBODIMENT

Figure 1:
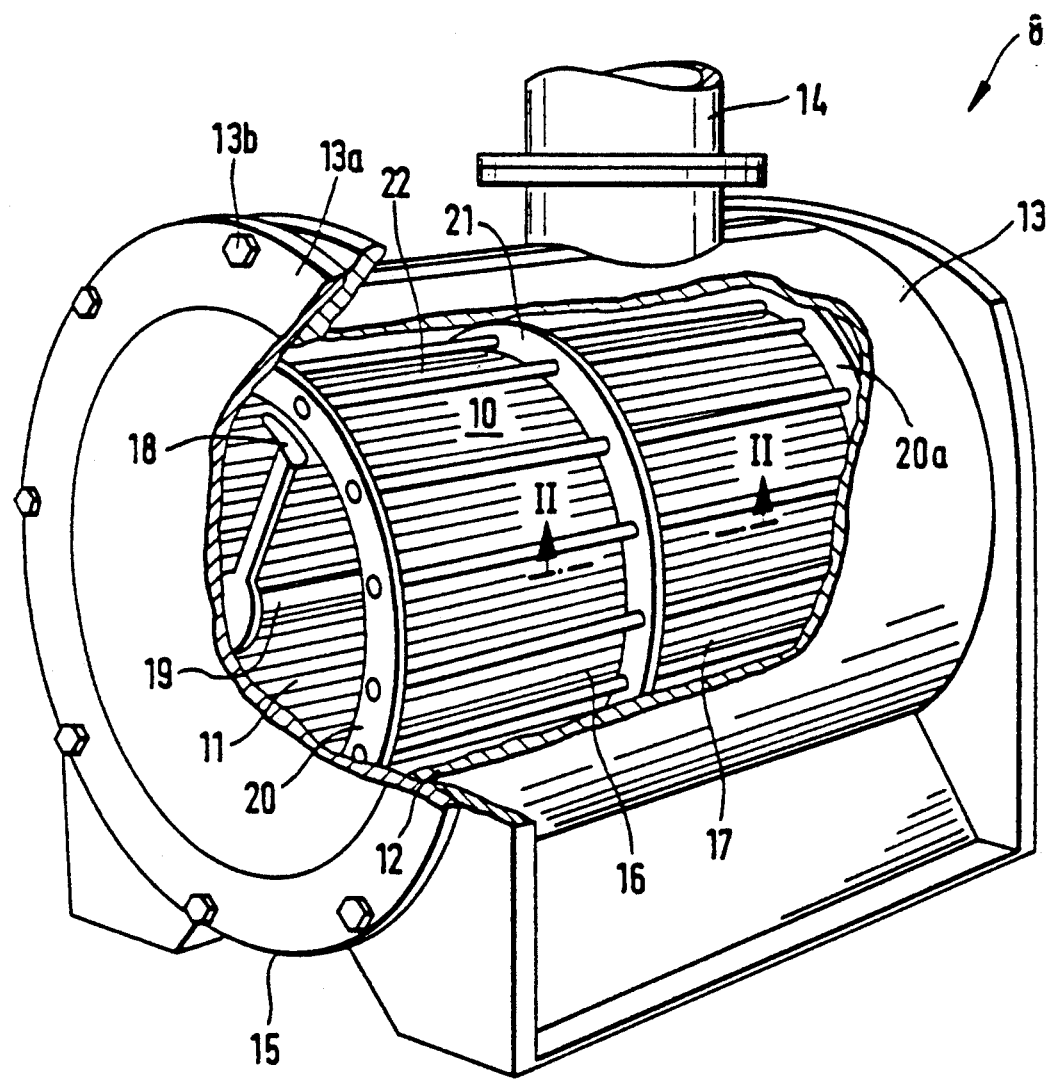
FIG. 1 is a perspective view, with portions broken away, illustrating a pulp screen structure utilizing a modular screen basket made of thin-walled material manufactured according to the present invention, to provide improved screening efficiency.

Referring now more specifically to the drawings, and to FIG. 1 in particular, numeral 8 designates a screening apparatus wherein previously treated pulp is screened to remove foreign elements such as shives, bark, knots, dirt, glass, plastic, and the like. A screen plate assembly is shown at 10, and defines in the apparatus 8 an interior chamber 11 where the pulp slurry to be screened enters the apparatus and an exterior chamber 12 where the screened pulp slurry flows out of the apparatus after passing through the screen plate assembly. The assembly is enclosed in a housing 13 which includes an end plate 13a secured by bolts 13b. The housing has an inlet, not shown, for admitting pulp into the interior chamber 11, and an outlet, not shown, leading from the chamber 11 for the foreign material to flow out of the apparatus, which foreign material has not passed through the screen plate assembly 10 from the interior chamber 11 to the exterior chamber 12. The accepted pulp, which has flowed from the interior chamber 11 through the screen plate assembly 10 to the exterior chamber 12, flows out of the screen apparatus 8 through the accepts outlet 14.

The screen plate assembly 10 is stationary within the housing 13, and a rotor 18 is mounted for rotation within the cylindrical screen plate assembly, for aiding passage of the pulp slurry through the screen plate, and to help inhibit plugging. The rotor is rotational about a rotary-driven shaft 19 which rotates in a clock-wise direction, as viewed in FIG. 1. The rotor shown is merely illustrative of a suitable type, and it should be understood that the present invention can be used for screen plates of various types for various pulse, turbulence, and combination pulse and turbulence generating rotors, particularly those most suitable for medium consistency screening.

The screen plate assembly 10 includes cylindrical screen sections 16 and 17 which, without support, are essentially flexible and would not withstand normal screen pressures. The screen sections, therefore, require rigidifying or strengthening for use in the pressurized environment of screen apparatus 8. The necessary support and strengthening is provided by end rings 20 and 20a, and an intermediate support ring 21. Each of the rings has grooves, such as illustrated by the grooves 23 and 24 in the ring 21 shown in FIG. 2. The grooves 23 and 24 are circular, to hold the screen sections in a substantially cylindrical shape. The grooves 23 and 24 have a radial dimension substantially equal to the radial thickness of the shaped screen plates.

The screen plates are formed from relatively thin, sheet-like material compared to the heretofore known machined screen plates. The thin material is formed into various shapes or contours, generally undulated, so as to present a substantial amount of screening area to the stock.

During assembly, each of the shaped screen plates is positioned into the grooves in the end rings 20 or 20a and the intermediate ring 21, and the rings are pulled together to force the screen plates into the grooves. For this purpose, axially extending rods 22 are provided, spaced circumferentially from each other, and the rods are provided at their ends with threads and nuts 22a, so that the nuts can be tightened to pull the end rings towards each other and force the ends of the screen plates into the grooves. The grooves are preferably tapered so that the slot becomes narrower in an inward direction toward the bottom of the groove. When the rods are tightened, the screen plates are pushed tightly into the tapered grooves, so that the screen plates are held firmly in a fixed position circumferentially. It should be recognized that the screen assemblies can be made of different lengths, longer or shorter, or even greater in number, and additional reinforcing intermediate rings, such as 21, may be employed between the ends of each of the adjacent screens.

Figure 2:
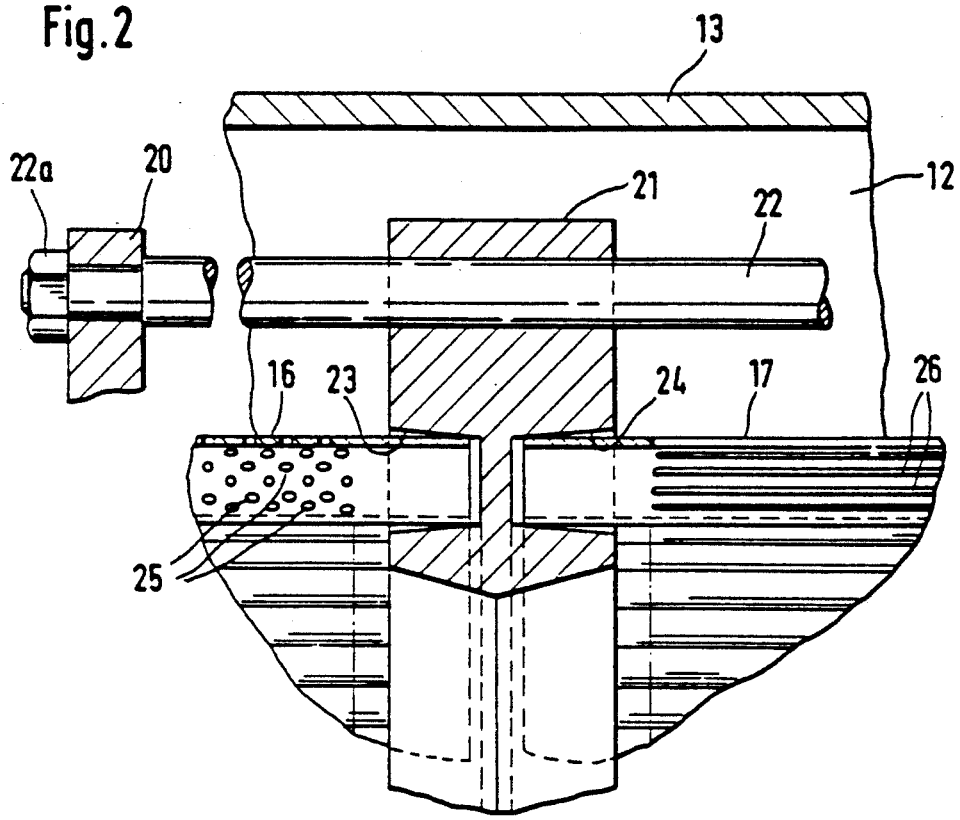
FIG. 2 is an enlarged fragmentary sectional view taken substantially along line II—II of FIG. 1.

Screen openings such as holes 25 or slots 26, as shown in FIG. 2, extend through the thin screen material, providing a path from the interior chamber 11 to the exterior chamber 12. It has been found that when holes 25 are provided, the material can be of about 0.035 inch thickness. For elongated openings, such as slots 26, material of about 0.048 inch thickness can be used. It will be recognized that, depending of the formation technique utilized, other sheet thicknesses may be employed.

The thin material of the screen sections may be stainless steel or similar sheet material which is formed in a generally cylindrical shape having undulations extending around the circumference of the screen. In a simplified form, the undulations may take the form of a series of upright and inverted U-shaped sections 27 and 28, or, in other words, the screen essentially consists of a series of deep corrugations. An undulation height of about 0.45 inch has been found to be acceptable. A suitable apparatus and method for forming the corrugations can be found in co-pending U.S. Ser. No. 07/206,151.

As taught there-n, the shape or pattern formed can be changed by modifying the shape of the forming tool used, and the thin, sheet-like material can be readily shaped or formed into the desired pattern, with the hole or slot opening being accurately located with a punching or lancing tool utilized in conjunction with the forming process, or by laser beam cutting. When slots are formed, coining or prestressing at the ends of the slots may be used to minimize crack formation and propagation, thereby increasing the wear life of the basket.

The modular screen basket of formed, thin, sheet-like material has made available a great variety of basket configurations, including the location of openings. It has now been discovered that, within certain parameters for slot location, corrugation frequency and the like, an increase in overall screen operation efficiency can be realized, particularly in screening medium consistency pulp slurry. Screen performance is greatly enhanced when the design parameters are followed.

Figure 4:
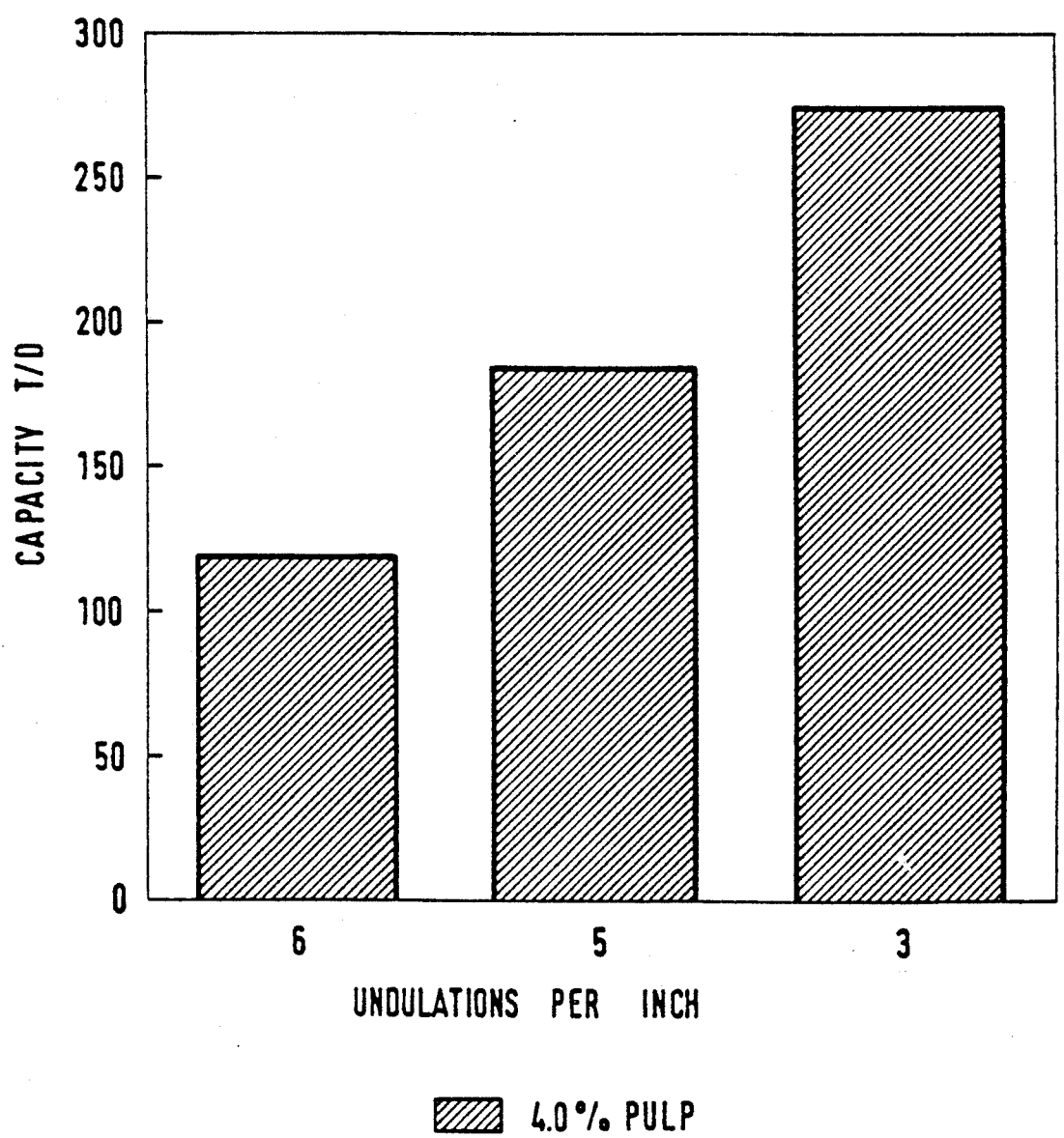
FIG. 4 is a graph illustrating test results performed with screen baskets of various corrugation frequencies.

In forming the corrugations or undulations with the thin, sheet-like material, it is possible to form the corrugations spaced relatively closely together or relatively far apart. All that is required is the proper formation tool. It has been found, however, that baskets having more than five undulations or corrugations per circumferential inch of the basket result in reduced screen capacity. Therefore, the thin, sheet-like material should be formed with five or less corrugations per inch, and preferably at three corrugations per inch. In a basket operated with the rotor of U.S. Pat. No. 4,855,038 on pulp at four percent consistency, six corrugations per inch yielded a capacity of approximately 120 tons per day, while five corrugations per inch yielded a capacity of approximately 185 tons per day. Three corrugations per inch yielded a capacity of 275 tons per day. The results of these tests are shown in the graph of FIG. 4.

Figure 5:
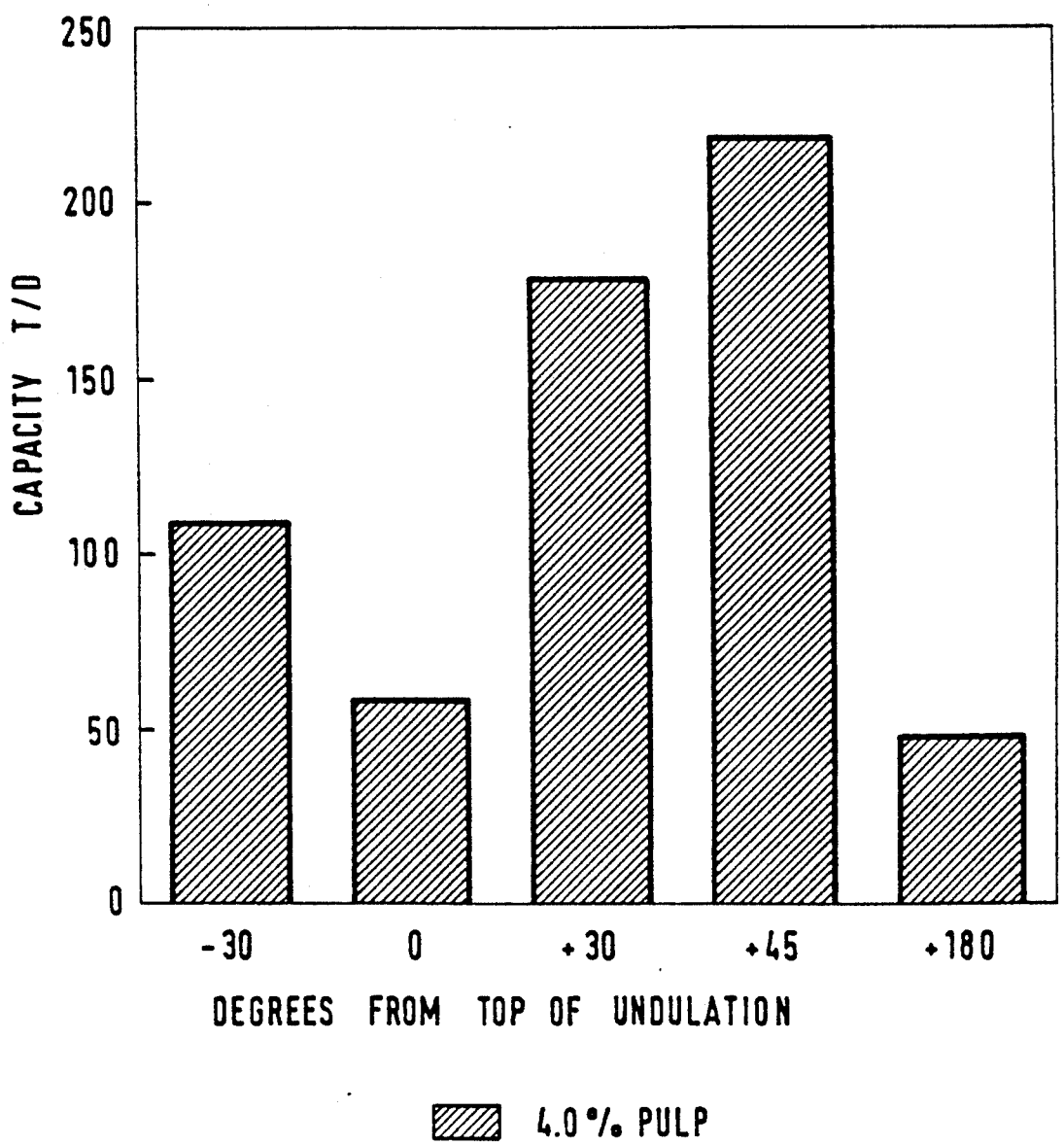
FIG. 5 is a graph illustrating test results from tests conducted on baskets having various slot locations.
Figure 6:
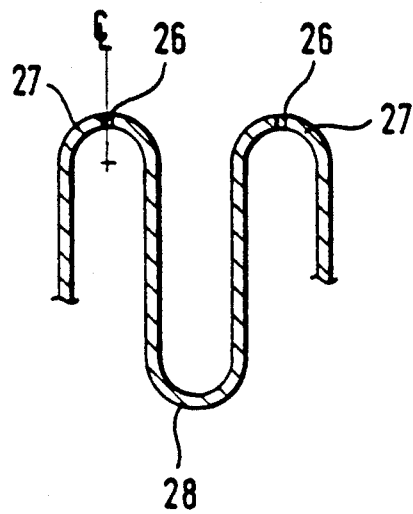
FIGS. 6, 7, 8, 9, and 10 illustrate, respectively, screen baskets having, respectively, slot locations are zero
Figure 7:
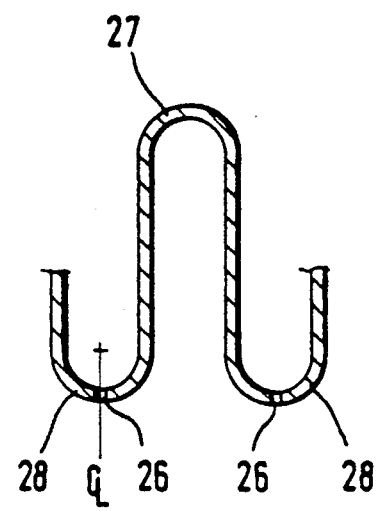
Figure 8:
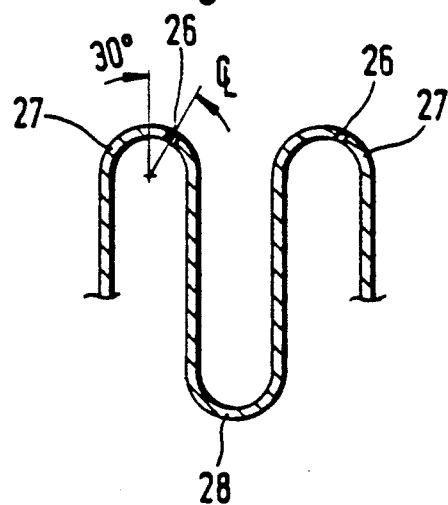
Figure 9:
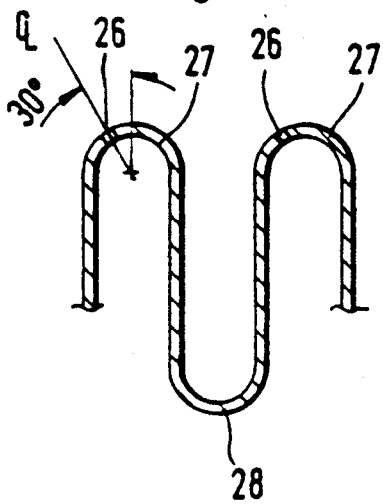
Figure 10:
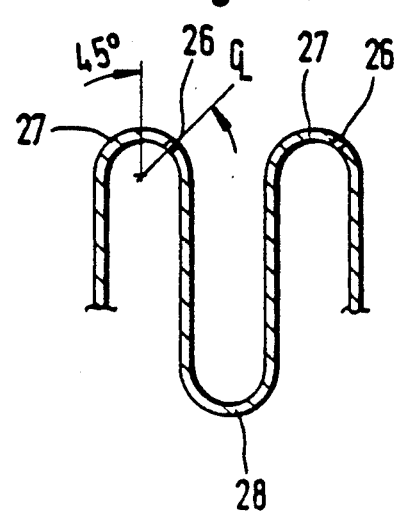

Utilizing the preferred corrugation frequency of three corrugations per inch, further tests were run with the same rotor to determine the optimum slot location. The results of these tests are indicated in FIG. 5. From these tests, it has been determined that the slot openings should be provided on the inside of the basket, that is on the corrugations or ridges closest to the rotor. In the graph of FIG. 5, zero degrees refers to that location at top dead center of the corrugations nearest the rotor, as illustrated in FIG. 6, and +180 degrees indicates the bottom dead center in the trough or corrugation farthest from the rotor, as illustrated in FIG. 7. At zero degrees or top dead center, the screen capacity was approximately 60 tons per day, while at 180 degrees or bottom dead center, capacity was 50 tons per day. At +30 degrees, which is 30 degrees downstream from the top dead center location, as shown in FIG. 8, the screen capacity was 180 tons per day. At −30 degrees, which is 30 degrees upstream from top dead center, as illustrated in FIG. 9, screen capacity was 120 tons per day. At +45 degrees, which is 45 degrees downstream from top dead center, as illustrated in FIG. 10, screen capacity was approximately 220 tons per day. Thus, slot location at +45 degrees is preferred, and the optimum range is from −30 to +45 degrees.

Figure 11:
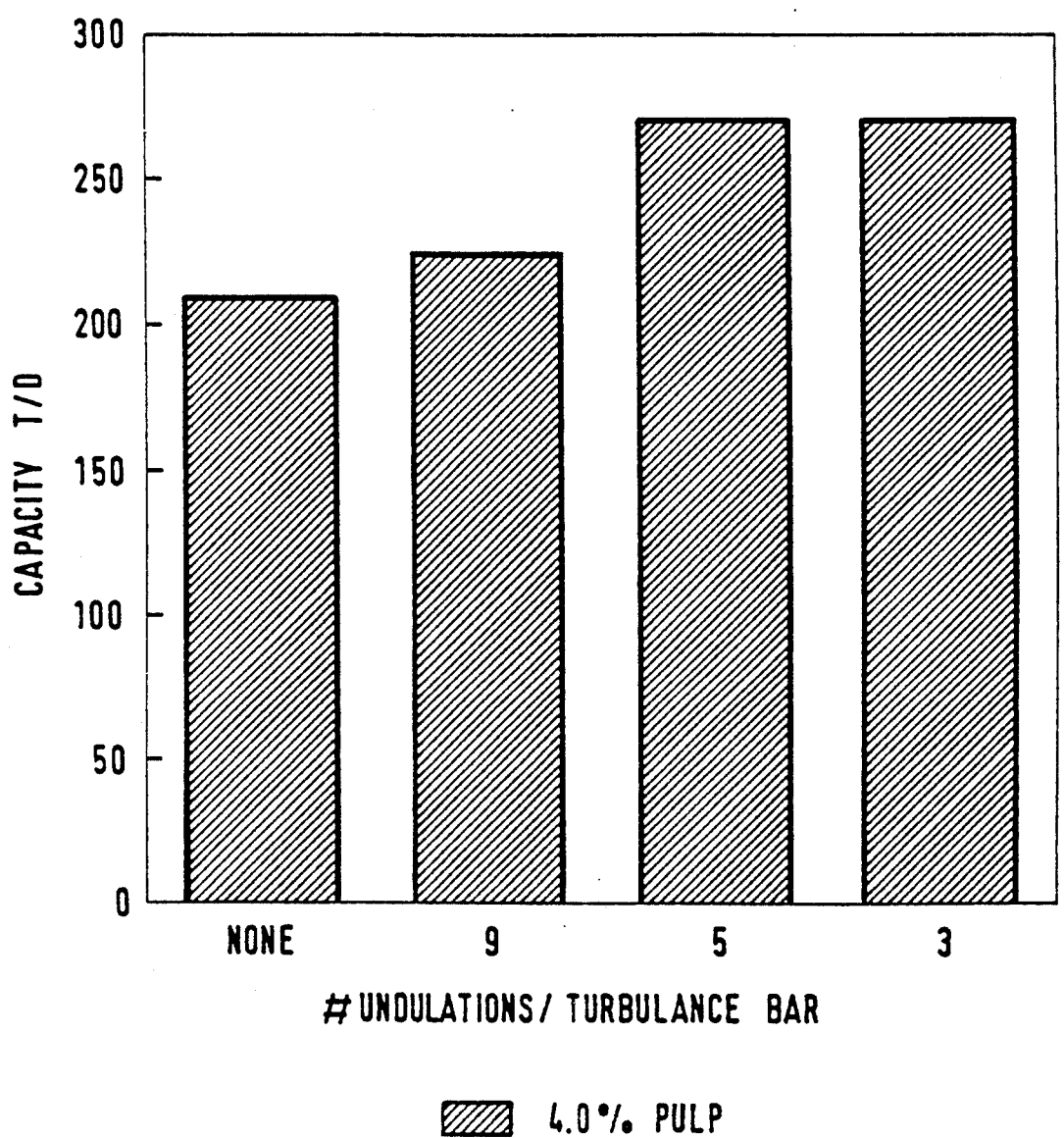
FIG. 11 is a graph illustrating the results of tests conducted on baskets having various turbulence bar locations.

It was further discovered that the use of turbulence or wear bars can increase screen capacity. FIG. 11 illustrates the results of tests run to determine the preferred number of turbulence bars, when screening four percent pulp. When no turbulence bars were utilized, screen capacity was approximately 210 tons per day. When one turbulence bar was provided in every ninth corrugation, the screen capacity was 225 tons per day. When one turbulence bar was provided in every fifth corrugation, screen capacity was 270 tons per day. When one turbulence bar was provided in each third corrugation, a capacity of 270 tons per day was also experienced.

Figure 12:
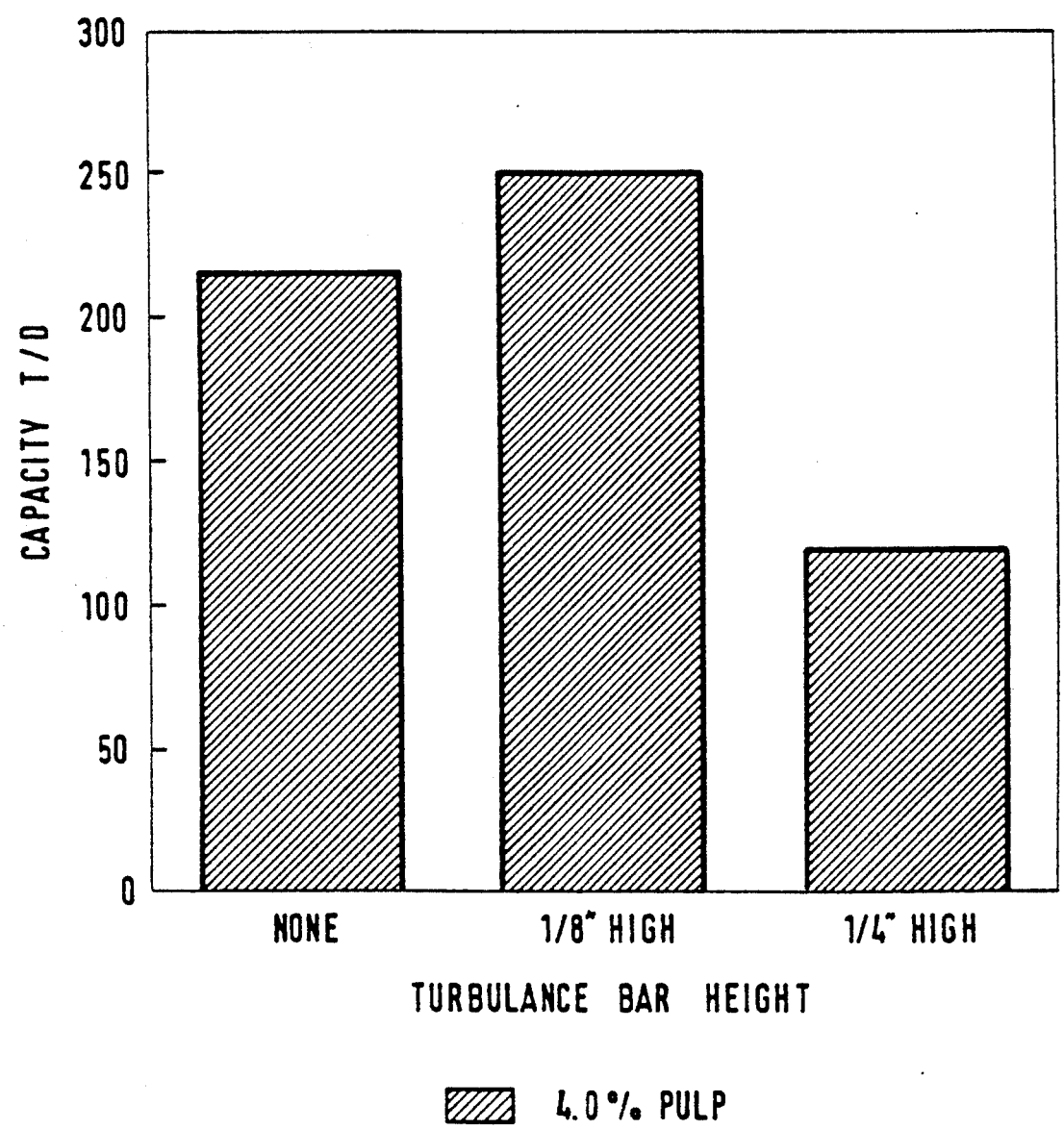
FIG. 12 is a graph illustrating test results conducted on baskets having various turbulence bar heights.

The effect of turbulence bar height was also investigated, and FIG. 12 displays in graphic form those results. The tests were again conducted with the rotor of U.S. Pat. No. 4,855,038 in a screen having about one-half inch rotor-to-basket spacing. Medium consistency pulp was used. When the turbulence bar was in height equal to the depth of the corrugation in which it was placed, screen capacity was approximately 215 tons per day. When the turbulence bar was provided to extend above the corrugation by one-eighth inch, the screen capacity increased to 250 tons per day. However, when the turbulence bar was provided to extend above the corrugation by one-quarter inch, screen capacity dropped to 120 tons per day.

Figure 3:
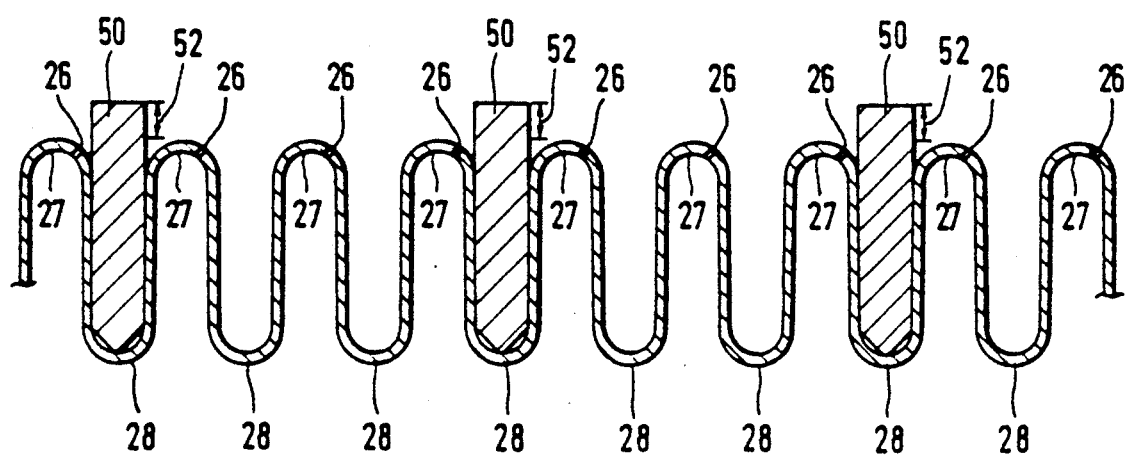
FIG. 3 is an enlarged cross-sectional view of a portion of screen basket shown in the previous figures, which has been constructed in accordance with the design parameters of the present invention, to result in increased screen efficiency.

FIG. 3 illustrates a preferred basket arrangement. The basket includes a series of undulations or corrugations having rotor side peaks 27 closest to the rotor, and valleys 28 farthest away. The corrugations are provided at a frequency of less than five corrugations per inch of basket circumference. Turbulence bars 50 are provided in every third corrugation, and project above the corrugations a distance 52 no more than about 0.187 inch. Slots 26 are provided oriented 45 degrees in the downstream direction from top dead center of the corrugation.

An optimized screen basket configuration has been shown and described in detail herein. It should be recognized, however, that various changes may be made without departing from the scope of the present invention.

We claim:

1. In a screen plate for use in a paper pulp pressure screening apparatus having a rotor operating near one side of the screen plate, the plate being a cylindrical screen basket formed of a relatively thin, sheet-like material of substantially uniform thickness therethrough, said material being formed into an undulating shape including a series of corrugation circumferentially around the screen providing inner ridges near the rotor and outer ridges, and having slots defining elongated screen openings formed therethrough, the improvement comprising:
   said slots being disposed axially in said basket and only on a downstream side from top dead center of inner ridges only; and
   said undulations being provided at not more than five undulations per circumferential inch of basket.

2. In the improved screen plate as defined in claim 1, the further improvement wherein said undulations are provided at not more than three undulations per circumferential inch of basket.

3. The improvement for a screen plate for use in paper pulp pressure screening apparatus as defined in claim 2, in which said openings are provided in regions between about top dead center of the ridges to about 45 degrees downstream from top dead center of the ridges.

4. The improved screen plate for use in paper pulp pressure screening apparatus as defined in claim 1, in which said openings are provided at locations approximately 45 degrees from top dead center of the ridges in a downstream direction.

5. In a screen plate for use in paper pulp pressure screening apparatus, the improvement as defined in claim 1, in which turbulence bars are provided in at least about one of every five undulations, and said turbulence bars extend substantially the length of the undulation in which it is located.

6. In a screen plate for use in a paper pulp pressure screening apparatus having a rotor operating near the screen plate, the plate being a screen formed of a relatively thin, sheet-like material of substantially uniform thickness therethrough, said material being formed into an undulating shape and having screen openings formed therethrough, the improvement comprising:
   said undulations being provided at not more than five undulations per circumferential inch of basket;
   turbulence bars being provided in at least about one of every five undulations; and
   said turbulence bars extending above adjacent peaks of undulations by a dimension not more than about one-fourth inch.

7. The improvement for a pressure pulp screening apparatus as defined in claim 6, in which said turbulence bars extend above adjacent peaks of undulations by a dimension not more than about one-eighth inch.

8. The improved screen plate for use in paper pulp pressure screening apparatus as defined in claim 7, in which said openings are provided at locations approximately 45 degrees from top dead center of the undulations in a downstream direction.

9. In the improved screen plate as defined in claim 8, the further improvement wherein said undulations are provided at not more than three undulations per circumferential inch of basket.

10. In a cylindrical screen plate for use in a paper pulp pressure screening apparatus having a rotor operating on one side of the screen plate near the screen plate, the plate comprising a cylindrical screen formed of a relatively thin, sheet-like material of substantially uniform thickness therethrough, said material being formed into an undulating shape providing a series of corrugations circumferentially about the plate, with ridges alternately on the inside and outside of the plate, and having elongated screening openings formed therethrough, the improvement comprising:

said elongated screening openings being formed in the ridges nearest the rotor and extending generally axially in the plate in areas between about top dead center of the inside ridges to about 45 degrees downstream from top dead center of the inside ridges.

11. The improvement for a screen plate as defined in claim 10 in which turbulence bars are provided in at least about one of every three corrugations, and extend substantially the length of the corrugation.

12. In a screen plate for use in a paper pulp pressure screening apparatus having a rotor operating on one side of the screen plate near the screen plate, the plate comprising a cylindrical screen formed of a relatively thin, sheet-like material of substantially uniform thickness therethrough, said material being formed into an undulating shape providing a series of corrugations circumferentially about the plate, with adjacent corrugation ridges on alternate sides of the plate, and having screening openings formed therethrough, the improvement comprising:

said screening openings being formed in the ridges nearest the rotor in areas between about 30 degrees upstream from top dead center of the ridges to about 45 degrees downstream from top dead center of the ridges;

turbulence bars provided in at least about one of every three corrugations; and said turbulence bars extending above adjacent peaks of undulations by a dimension not more than about one-fourth inch.

13. The improvement for a pressure pulp screening apparatus as defined in claim 12, in which said turbulence bars extend above adjacent peaks of undulations by a dimension not more than about one-eighth inch.

14. In a cylindrical screen plate for use in a paper pulp pressure screening apparatus having a rotor operating near the screen plate, the distance separating the screen and rotor being a rotor-to-screen spacing, the plate comprising a screen formed of a relatively thin, sheet-like material of substantially uniform thickness therethrough, said material being formed into an undulating shape including a series of corrugations circumferentially about the basket and having screening openings formed therethrough, the improvement comprising:

turbulence bars disposed in at least about one of every five corrugations and extending axially in the corrugations, substantially the length of the corrugation.

15. In a screen plate for use in a paper pulp pressure screening apparatus having a rotor operating near the screen plate, the plate comprising a screen formed of a relatively thin, sheet-like material of substantially uniform thickness therethrough, said material being formed into an undulating shape including a series of circumferential corrugations in the plate and having screening openings formed therethrough, the improvement comprising:

turbulence bars disposed in at least about one of every five corrugations;

said turbulence bars extending above adjacent peaks of undulations by a dimension not more than about one-fourth inch.

16. The improvement for a pressure pulp screening apparatus as defined in claim 15, in which said turbulence bars extend above adjacent peaks of undulations by a dimension not more than about one-eighth inch.

17. In a screen plate for use in a paper pulp pressure screening apparatus having a rotor operating near but spaced from the screen plate the distance separating the screen and rotor being a rotor-to-screen spacing, the plate comprising a screen formed of a relatively thin, sheet-like material of substantially uniform thickness therethrough, said material being formed into an undulating shape including a series of corrugations circumferentially about the basket, and having screening openings formed therethrough, the improvement comprising:

turbulence bars disposed in at least about one of every five corrugations;

said turbulence bars extending above adjacent peaks of undulations by a dimension not more than about one-half the distance of rotor-to-screen spacing.

* * * * *

UNITED STATES PATENT AND TRADEMARK OFFICE
CERTIFICATE OF CORRECTION

PATENT NO. : 5,041,212
DATED : 08/20/91
INVENTOR(S) : William Gero et al

It is certified that error appears in the above—identified patent and that said Letters Patent is hereby corrected as shown below:

Column 6, line 15: "corrugation" should read --corrugations--.

Signed and Sealed this

Tenth Day of November, 1992

Attest:

DOUGLAS B. COMER

*Attesting Officer*     Acting Commissioner of Patents and Trademarks